United States Patent
Rogers et al.

(10) Patent No.: US 10,125,268 B2
(45) Date of Patent: Nov. 13, 2018

(54) REMOVABLE PAINT COMPOSITION

(71) Applicants: Delaine Rogers, Canton, GA (US); Christopher G. Gore, Cartersville, GA (US)

(72) Inventors: Delaine Rogers, Canton, GA (US); Christopher G. Gore, Cartersville, GA (US)

(*) Notice: Subject to any disclaimer, the term of this patent is extended or adjusted under 35 U.S.C. 154(b) by 231 days.

(21) Appl. No.: 15/271,567

(22) Filed: Sep. 21, 2016

(65) Prior Publication Data

US 2017/0081524 A1  Mar. 23, 2017

Related U.S. Application Data

(60) Provisional application No. 62/221,293, filed on Sep. 21, 2015.

(51) Int. Cl.
*C09D 133/08* (2006.01)
*C09D 5/00* (2006.01)

(52) U.S. Cl.
CPC ........... *C09D 5/008* (2013.01); *C09D 133/08* (2013.01)

(58) Field of Classification Search
CPC .................................................. C09D 133/08

USPC ......................................................... 524/428
See application file for complete search history.

(56) References Cited

U.S. PATENT DOCUMENTS

| 5,453,459 | A | * | 9/1995 | Roberts | C09D 5/008 510/202 |
| 6,011,107 | A | * | 1/2000 | Maxwell | C09D 133/06 524/380 |
| 7,803,869 | B2 | * | 9/2010 | Warren | C09D 175/04 524/804 |

* cited by examiner

*Primary Examiner* — Doris L Lee
(74) *Attorney, Agent, or Firm* — Fish & Richardson P.C.

(57) ABSTRACT

A removable paint composition that includes (a) 10-90% by weight, based on dry solids weight, of an acrylic copolymer binder having an acid number between 35 and 100 (expressed as grams KOH/gram polymer), and a Tg between −15° C. and 35° C.; (b) a pigment or dye in an amount sufficient to achieve a desired color; (c) 0.30 to 3.0% by weight, based on dry solids weight, of ammonium hydroxide to achieve a composition pH of 6.5 to 9.7; and (d) water. The paint composition is free of urethane polymers and is removable from a surface upon application of an aqueous amine solution.

10 Claims, No Drawings

REMOVABLE PAINT COMPOSITION

CLAIM OF PRIORITY

This application claims priority to U.S. Provisional Application Ser. No. 62/221,293, filed on Sep. 21, 2015, the entire contents of which are hereby incorporated by reference.

TECHNICAL FIELD

This invention relates to removable, water-based paint compositions.

BACKGROUND

Homeowners and business owners desiring to change the color of a surface such as an interior wall or ceiling have the option of re-painting the surface or covering the surface with wallpaper or fabric. These options are acceptable if the objective is to change the color of the underlying surface permanently because the newly applied paint, wallpaper, or fabric typically cannot be removed without distorting the underlying surface. However, these options are impractical if it is desired to change the color of the surface only temporarily, e.g., for the holidays, and then re-generate the original surface.

SUMMARY

A removable paint composition is described that includes (a) 10-90% by weight, based on dry solids weight, of an acrylic copolymer binder having an acid number between 35 and 100 (expressed as grams KOH/gram polymer), and a Tg between $-15°$ C. and $35°$ C.; (b) a pigment or dye in an amount sufficient to achieve a desired color; (c) 0.30 to 3.0% by weight, based on dry solids weight, of ammonium hydroxide to achieve a composition pH of 6.5 to 9.7; and (d) water. The paint composition is free of urethane polymers and is removable from a surface upon application of an aqueous amine solution. In some embodiments, the binder has an acid number between 50 and 70. In some embodiments, the binder has a Tg between $-5°$ C. and $20°$ C. In still other embodiments, the amount of acrylic copolymer binder is between 25 and 45% by weight, based on dry solids weight. The removable paint composition may be included in a kit that also contains a paint remover comprising an aqueous amine solution. Examples of suitable aqueous amines are hydroxyalkyl amines such as triethanol amine.

The paint compositions may be applied to a surface and then readily removed by simple application of an aqueous amine solution. The compositions are particularly useful for application to interior surfaces such as walls and ceilings, where they allow users to change the color of the surface temporarily and then readily remove the paint without damaging the underlying surface. The paint compositions thus expand the range of interior decoration options available to homeowners and organizations such as schools, hospitals, and day care centers. The paint compositions are easy to apply and remove, making them suitable for use by both professional painters and do-it-yourself consumers.

The details of one or more embodiments of the invention are set forth in the description below. Other features, objects, and advantages of the invention will be apparent from the description and from the claims.

DETAILED DESCRIPTION

The removable paint composition includes (a) 10-90% by weight (e.g., 25-45% by weight), based on dry solids weight, of an acrylic copolymer binder having an acid number between 35 and 100 (e.g., between 50 and 70) (expressed as grams KOH/gram polymer), and a Tg between $-15°$ C. and $35°$ C. (e.g., between $-5°$ C. and $20°$ C.); (b) a pigment or dye in an amount sufficient to achieve a desired color; (c) 0.30 to 3.0% by weight, based on dry solids weight, of ammonium hydroxide to achieve a composition pH of 6.5 to 9.7; and (d) water. The paint composition is free of urethane polymers and is alkali-sensitive (i.e. it is removable from a surface upon application of an aqueous amine solution).

The acrylic copolymer binder typically is in the form of an emulsion at pH less than 6.5. Multiple alkali-sensitive acrylic copolymer binders having acid numbers and Tg values falling within the range set forth above may be used as well. In addition, the composition may contain other polymer binders so long as the type and/or amount of the binders do not interfere with the ability of the paint to be removed upon application of an aqueous amine solution. The paint composition may also contain one or more other ingredients such as thickeners, surfactants, defoamers, corrosion inhibitors, biocides, fillers, and the like.

The paint remover is an aqueous solution that includes a water-soluble amine. Suitable amines including hydroxyalkyl amines having between 1 and 3 hydroxyalkyl groups where the alkyl group is a $C_1$ to $C_6$ alkyl group. Amine concentrations generally are between 15 and 25% by weight of the solution. One example of a useful paint remover is an aqueous solution of triethanolamine, e.g., Flexiclean 20AG available from Innovative Chemical Technologies, Inc. This solution offers the advantage that it is low-odor, making it particularly useful in interior applications. The paint remover may also contain one or more other ingredients such as thickeners, surfactants, defoamers, corrosion inhibitors, biocides, and the like.

In use, the paint composition is applied to a desired surface using conventional means such as a brush, roller, spray, or sponge and allowed to dry. Examples of suitable surfaces include non-porous surfaces such a sheet flooring, drywall, cinder block, rubber, tile, concrete, hardwood, vinyl, and the like. When it is desired to remove the paint from the surface, the paint remover is applied to the paint-covered surface using a brush, mop, spray, or sponge. After approximately 10 minutes, gentle agitation removes the paint to regenerate the original surface. If desired, the surface may be washed with water following paint removal.

EXAMPLE

A pigment slurry was prepared by combining the following ingredients:

| Ingredient | Description | Amount (grams) |
|---|---|---|
| Water | | 13.64 |
| Propylene Glycol | | 10.0 |
| Flexisperse 450N (Innovative Chemical Technologies, Inc.) | Aqueous, fully neutralized sodium polyacrylate dispersant | 0.7 |
| Tergitol 15-S-9 (Dow Chemical Co.) | Secondary alcohol ethoxylate nonionic surfactant | 0.60 |
| Foamblast SAD (Emerald Performance Materials) | Non-silicone, non-mineral anti-foam agent | 0.10 |
| Acrysol RM2020 NPR (Dow Chemical Co.) | Rheology modifier. 3:1 mixture of 5-chloro-2-methyl-2H-isothiazol-3-one and 2-methyl-2H-isothiazol-3-one | 2.0 |
| TiPure R706 (DuPont) | Titanium dioxide pigment | 72.0 |

A let-down mix was prepared as follows. 143 g of a carboxylated, all-acrylic copolymer binder emulsion (Flexisperse 38 RP, Innovative Chemical Technologies), 2.5 g of Texanol (an ester alcohol coalescent, Eastman Chemical Co.), and 0.14 g of Foamblast SAD anti-foam agent (Emerald Performance Materials) were combined to form a first mixture. To this mixture was added a premix consisting of 1.5 g ammonia (28% aqueous) and 8 g water to form a second mixture. A second premix was prepared by combining 0.80 g of Acrysol SCT-275 rheology modifier (2-(2-butoxyethoxy) ethanol, Dow Chemical Co.), and 1.8 g of water. The second premix was added to the second mixture to form the let down mix. The resulting let down mix was then added to the pigment slurry to form a white paint having a viscosity of 5500 cps (Brookfield, #6 spindle, 100 rpm).

When applied to a non-porous surface, the paint could be readily removed using an aqueous amine solution (triethanolamine) to regenerate the original surface. Typically, the aqueous amine solution was applied to the painted surface and allowed to sit for approximately 10 minutes.

A number of embodiments of the invention have been described. Nevertheless, it will be understood that various modifications may be made without departing from the spirit and scope of the invention. Accordingly, other embodiments are within the scope of the following claims.

What is claimed is:

1. A removable paint composition:
   (a) 10-90% by weight, based on dry solids weight, of an acrylic copolymer binder having an acid number between 35 and 100 (expressed as grams KOH/gram polymer), and a Tg between −15° C. and 35° C.;
   (b) a pigment or dye in an amount sufficient to achieve a desired color;
   (c) 0.30 to 3.0% by weight, based on dry solids weight, of ammonium hydroxide to achieve a composition pH of 6.5 to 9.7; and
   (d) water,
   wherein the paint composition is free of urethane polymers and is removable from a surface upon application of an aqueous amine solution.

2. The removable paint composition of claim 1, wherein the acrylic copolymer binder has an acid number between 50 and 70.

3. The removable paint composition of claim 1, wherein the acrylic copolymer binder has a Tg between −5° C. and 20° C.

4. The removable paint composition of claim 1, wherein the acrylic copolymer binder is present in an amount ranging from 25-45% by weight, based on dry solids weight.

5. A kit comprising:
   (A) a removable paint composition comprising:
      (i) 10-90% by weight, based on dry solids weight, of an acrylic copolymer binder having an acid number between 35 and 100 (expressed as grams KOH/gram polymer), and a Tg between −15° C. and 35° C.;
      (ii) a pigment or dye in an amount sufficient to achieve a desired color;
      (iii) 0.30 to 3.0% by weight, based on dry solids weight, of ammonium hydroxide to achieve a composition pH of 6.5 to 9.7; and
      (iv) water,
      wherein the paint composition is free of urethane polymers and is removable from a surface upon application of an aqueous amine solution; and
   (B) a paint remover comprising an aqueous amine solution.

6. The kit of claim 5, wherein the acrylic copolymer binder has an acid number between 50 and 70.

7. The kit of claim 5, wherein the acrylic copolymer binder has a Tg between −5° C. and 20° C.

8. The kit of claim 5, wherein the acrylic copolymer binder is present in an amount ranging from 25-45% by weight, based on dry solids weight.

9. The kit of claim 5, wherein the aqueous amine solution comprises a hydroxyalkyl amine.

10. The kit of claim 9, wherein the hydroxyalkyl amine comprises triethanol amine.

* * * * *